United States Patent
Erlund et al.

[19]

[11] Patent Number: 6,096,120
[45] Date of Patent: Aug. 1, 2000

[54] DEAERATION VESSEL

[75] Inventors: Harry Erlund, Espoo, Finland; Hamid A. Lugmani, Kirchheim/Teck, Germany

[73] Assignee: Ahlstrom Machinery Oy, Helsinki, Finland

[21] Appl. No.: 09/051,980

[22] PCT Filed: Oct. 21, 1996

[86] PCT No.: PCT/FI96/00555

§ 371 Date: May 26, 1998

§ 102(e) Date: May 26, 1998

[87] PCT Pub. No.: WO97/15717

PCT Pub. Date: May 1, 1997

[30] Foreign Application Priority Data

Oct. 24, 1995 [FI] Finland ..................................... 955061

[51] Int. Cl.⁷ .............................. D21D 5/26; B01D 19/00
[52] U.S. Cl. ................................ 96/182; 96/183; 96/193; 96/197; 96/204; 96/190; 96/155; 96/170; 162/264; 162/380; 209/728
[58] Field of Search ..................................... 162/339, 343, 162/380, 252, 264, 190; 96/182, 183, 184, 193, 197, 200, 190, 155, 170, 204, 215; 209/728, 729

[56] References Cited

U.S. PATENT DOCUMENTS

| | | | |
|---|---|---|---|
| 2,931,503 | 4/1960 | Clark | 162/380 |
| 3,131,117 | 4/1964 | Hickey | 162/190 |
| 3,206,917 | 9/1965 | Kaiser et al. | 96/248 |
| 3,421,622 | 1/1969 | Wurtmann | 209/731 |
| 3,432,036 | 3/1969 | Kaiser | 209/729 |
| 3,538,680 | 11/1970 | Kaiser | |
| 3,720,315 | 3/1973 | Kaiser | 209/728 |
| 3,812,007 | 5/1974 | Kaiser | 162/343 |
| 4,219,340 | 8/1980 | Kaiser | 96/266 |
| 4,238,208 | 12/1980 | Frykhult et al. | 96/170 |
| 4,419,109 | 12/1983 | Matula | |
| 5,308,384 | 5/1994 | Kapanen et al. | |

OTHER PUBLICATIONS

Opposition and exhibits in Finland dated Dec. 30, 1998.

Primary Examiner—Jose Fortuna
Attorney, Agent, or Firm—Nixon & Vanderhye P.C.

[57] ABSTRACT

An improved double acting deaeration vessel is most desirably used in the pulp and paper industry. The deaeration vessel removes gas from a fiber suspension without requiring fine adjustment of the final consistency of the suspension fed to the deaeration vessel. In the same gas volume where the fiber suspension is treated in the deaeration vessel a second partition wall forming a second weir is provided, and the vessel jacket is provided with one or more inlets for a second fluid medium to be introduced into the vessel, with an outlet for the substantially gas free second fluid medium. A common outlet is provided in the common gas volume for gas separated from both the fiber suspension in the second fluid medium, as well as an outlet for the fraction of the second fluid medium separated by the weir.

19 Claims, 2 Drawing Sheets

DEAERATION VESSEL

CROSS REFERENCE TO RELATED APPLICATION

This application is a U.S. national phase of PCT/FI96/00555 filed Oct. 21, 1996.

BACKGROUND AND SUMMARY OF THE INVENTION

The present invention relates to a deaeration vessel used in the paper and pulp industry. Especially, it relates to a deaeration vessel comprising the vessel itself, a partition wall arranged therein and forming a weir K1 and, arranged in the vessel jacket, inlets for a first medium to be introduced into the vessel, outlets for a substantially gas-free first medium, an outlet for separated gas, and an outlet for a surface flow/fraction of the first medium, which surface flow/fraction has been separated by weir K1.

Experts of the field know these deaeration vessels best by the trademark DECULATOR® (A. Ahlstrom Corporation). These deaeration vessels are used especially in the paper and pulp industry. As implied by their name, these vessels are purposed for removing gas, e.g., from a fiber suspension.

Deaeration vessels, like the one discussed in DE-A1-42 34 522, are large vessels, into which the fiber suspension to be fed to the papermaking machine is introduced as a dilute mixture. The inside of the deaeration vessel is normally divided into two compartments by a weir. The operating principle of the vessel is such that the dilute fiber suspension is introduced into the vessel at the first side of the weir where the suspension is subjected to sub-atmospheric pressure which separates the gas into a so-called gas space from where it is discharged from the vessel. A further operational feature of the vessel is to allow other light impurities to be separated onto the liquid surface in the vessel because of their lightness and then discharge them along with the surface flow/fraction from the vessel to the second side of the weir. The suspension directed to the papermaking machine is withdrawn through an opening in the bottom of the vessel at the first side of the weir, the idea naturally being to withdraw fiber suspension in as gas-free a state as possible from the vessel. In order to maximize the deaeration capability of the vessel, the vessel is evacuated by means of a vacuum pump, whereby the gas is withdrawn from the vessel via the vacuum pump. The deaeration capability is further enhanced by introducing liquid via nozzles above the level of liquid in the vessel at the first side of the weir and by causing the introduced liquid to hit, e.g., the ceiling of the deaeration vessel, whereby the gas, if any, present in the liquid is the form of bubbles is separated prior to the liquid becoming into contact with the liquid in the vessel. Equipment in accordance with a so-called DECULATOR® Flying Wing process disclosed in, e.g., Finnish patent 47795 (U.S. Pat. No. 3,538,680) is used for cleaning of papermaking stock and removing of air/gas therefrom.

It is previously known that the final consistency of the stock to be fed from the headbox to the wire section is preferably fine-adjusted just before the headbox or in connection therewith. This fine adjustment requires deaerated fresh water or equivalent.

The medium being introduced into the papermaking machine and substantially comprising stock is hereinafter referred to as a first medium. The white water, fresh water, or equivalent needed for the fine adjustment of the stock consistency is hereinafter referred to as a second medium. The second medium is deaerated in a separate deaeration means, in accordance with prior art.

Our invention relates to an improved apparatus for preparing the gas-free or substantially gas-free second medium, required for the fine-adjustment of the stock consistency.

It is a characteristic feature of the deaeration vessel according to the invention that the same gas space where the first medium is treated in the vessel, is provided with a second partition wall forming a second weir K2 and that the vessel jacket is provided with an inlet/inlets for a second medium to be introduced into the vessel and with an outlet for a substantially gas-free second medium, and that the common gas space is provided with an outlet known per se, which outlet is intended for the gas separated from both the first and the second medium, and with an outlet for the surface flow/fraction of the second medium separated by weir K2.

In accordance with the arrangement of the invention, the deaeration of the second medium employs the same equipment as the deaeration of stock to be introduced into the headbox. Thus the water, preferably white water, used for adjusting the final stock consistency is preferably taken from the wire pit and conveyed to a deaeration vessel, which may be of, e.g., the same type as DECULATOR® deaeration vessels and in which the water is deaerated. The equipment in accordance with the invention is easy to connect with prior art deaeration vessels. For example an end of a cylindrical deaeration vessel is readily provided with means, such as necessary conduits and weir, needed for deaeration of dilution water, i.e., the second medium, by extending the vessel. The arrangement of the present invention utilizes means existing in the deaeration vessel, for removal of gas. Deaeration of the first and the second medium in one and the same gas space, i.e., in one vessel, brings an obvious space saving. The equipment also forms a whole. If the so-called Flying Wing type deaeration means is used, it is easy to add deaeration means for the second medium in accordance with our invention to an end of this structure.

The surface flow/fraction of the second medium, separated by a weir, may be discharged from the vessel through a separate outlet. In that case, weirs K1 and K2 have a partition wall between them, to separate the surface flows/fractions, separated by a weir, of the first and the second medium from each other.

When the second medium has been deaerated, this second medium, which is e.g. water removed from the wire of the papermaking machine, fresh water, or a mixture of these, is conveyed via a pump and appropriate screens to the headbox, where the ultimate fine-adjustment of the consistency of the stock to be fed to the wire is effected. By white water is meant water discharged from the wire of the papermaking machine.

BRIEF DESCRIPTION OF THE DRAWINGS

The deaeration vessel according to the invention will be described more in detail in the following, by way of example, with reference to the enclosed drawings, in which.

DETAILED DESCRIPTION OF THE DRAWINGS

Figure 1:
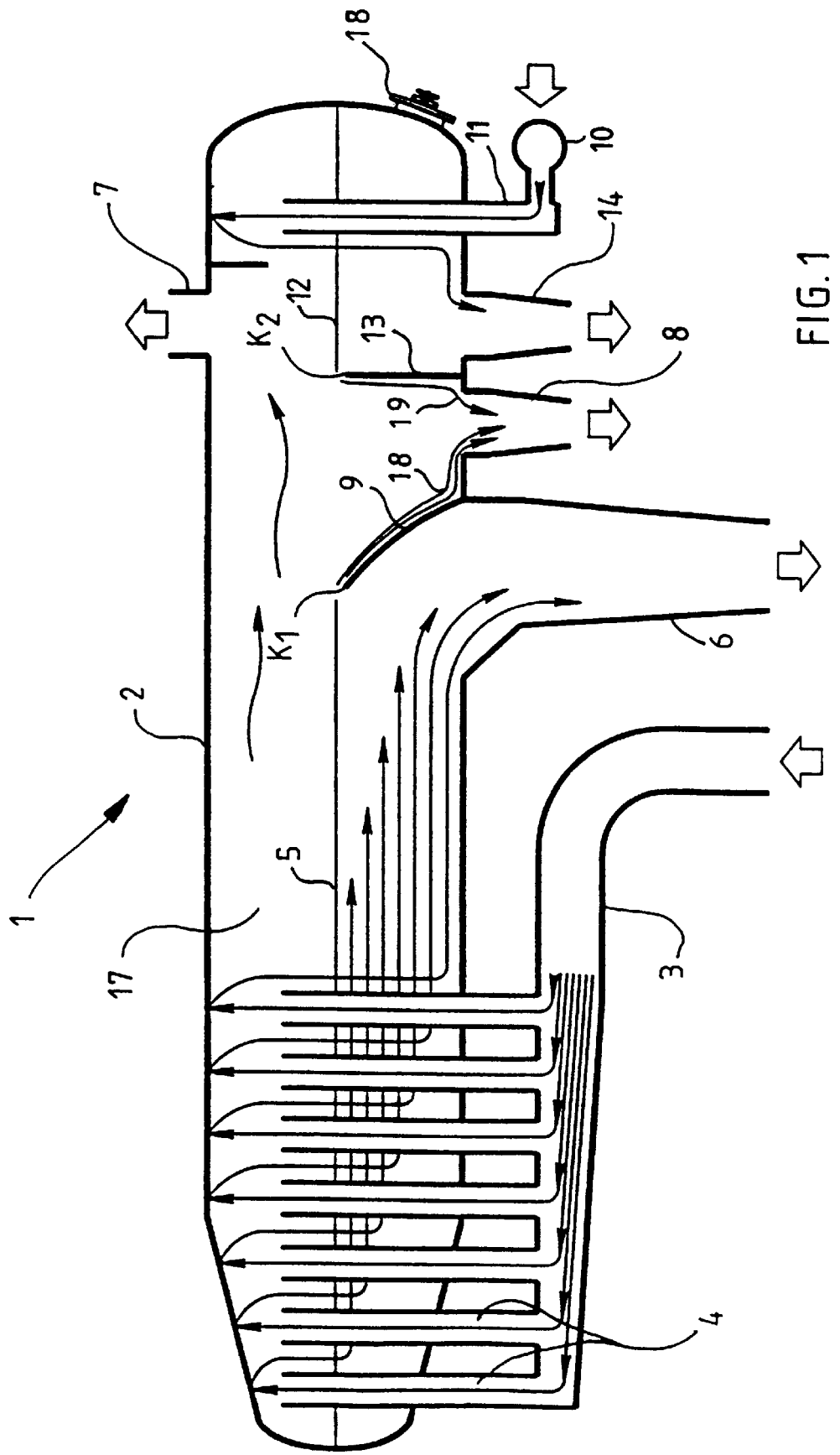
FIG. 1 is a schematic illustration, showing a sectional side view of a deaeration vessel in accordance with the invention, and FIG. 2 a schematic illustration, showing a sectional side view of a second deaeration vessel in accordance with the invention.

In accordance with FIG. 1, the deaeration vessel 1 according to the invention comprises a jacket 2, an inlet header 3 for a first medium, such as e.g. a suspension, to be handled, feed pipes or inlets 4, an outlet 6 for the deaerated first medium, such as a suspension, gas evacuation/vacuum duct 7, a plate 9 forming a weir K1, and an outlet 8 for a fraction or a surface flow of the first medium separated by a weir K1. The surface of the first medium in the deaeration vessel 1 is denoted with reference numeral 5. At the other end of the deaeration vessel 1 is disposed an inlet header 10 for the second medium, such as white water (=water discharged from the wire of the papermaking machine), and a feed pipe/feed pipes or inlets 11 for the second medium, an outlet 14 for the gas-free second medium, such as white water, and a gas evacuation/vacuum duct 7. The surface of the second medium in the deaeration vessel 1 is denoted with reference numeral 12. Thus, the deaerating means of the first and the second mediums are common, which is only natural and advantageous, because both the first and the second medium are treated in the same gas space. A plate 13 forms a weir K2. The outlet for the fraction 19 or surface flow of the second medium, separated by weir K2, is denoted with reference numeral 8 in FIG. 1. In this arrangement of our invention, the surface flows separated by weirs K1 and K2 are conveyed to one and the same space, wherefrom they are discharged via outlet 8 from the deaeration vessel 1. Leading the surface flows (fractions) separated by weirs K1 and K2 into one and the same space, wherefrom they are discharged from the deaeration vessel 1 via a common outlet 8, makes it possible to make the construction of the deaeration vessel as simple as possible. A maintenance hatch is denoted with reference numeral 18.

Figure 2:
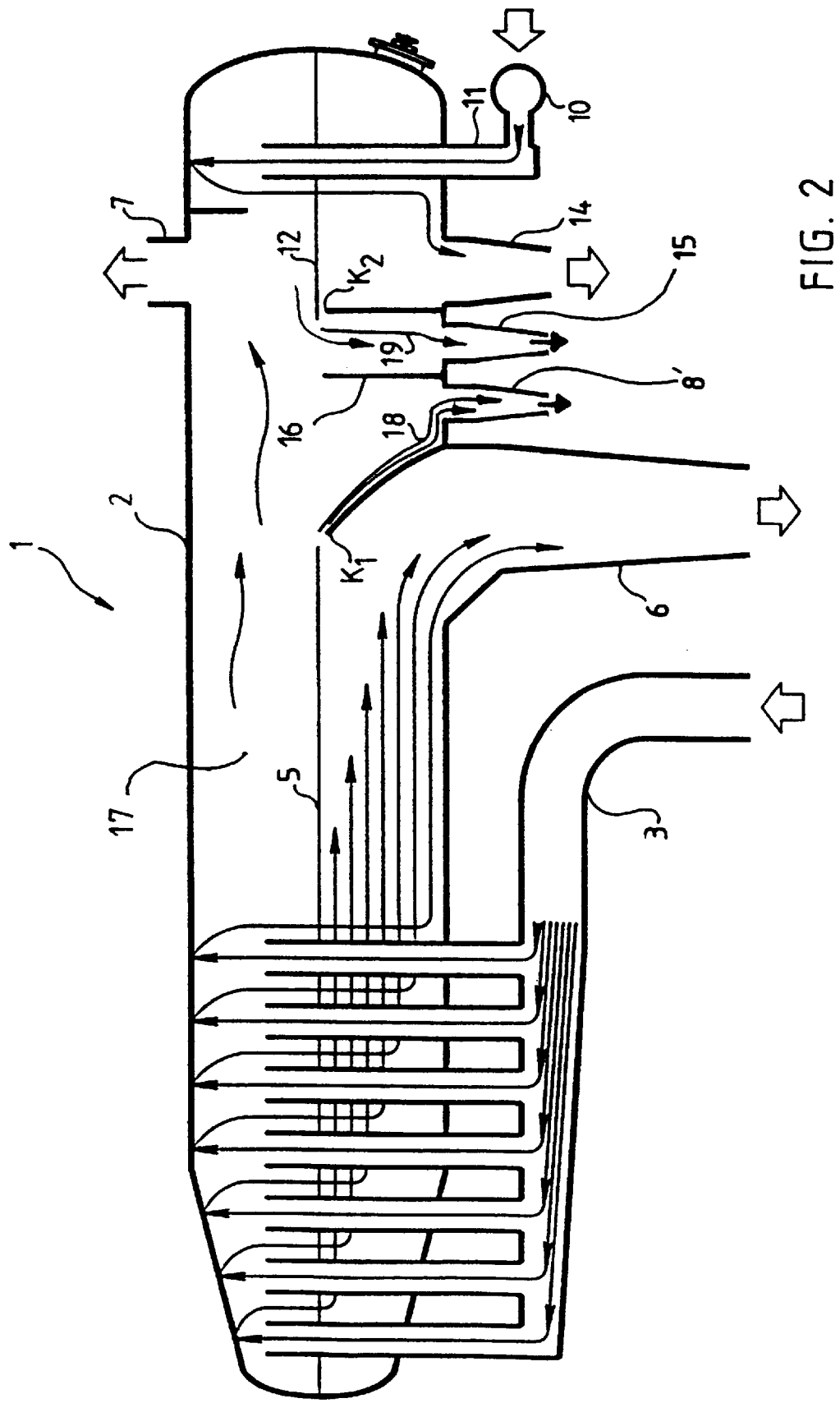

The arrangement shown in FIG. 2 is otherwise identical with that shown in FIG. 1, except that the surface flows (fractions) of both mediums, which surface flows have been separated by weirs K1 and K2, are conveyed to spaces of their own, which spaces are separated by a partition wall 16, and therefrom they are discharged via separate outlets 8' and 15 from the deaeration tank 1 for further treatment.

As described above, the deaeration vessel may be, e.g., of Multi-Retention type or of the so-called Flying Wing type. The arrangement of our invention is applicable to deaeration vessels of other types also. When the deaeration means of the second medium, which is most usually a mixture of white water and/or white water and fresh water, is constructed to form an extension to a prior art deaeration vessel, we receive a construction which is compact and readily implemented. Hereby, it is advantageous to arrange discharging of the surface flow (fraction) of both mediums via one and the same space and outlet. If each fraction is to be discharged separately, a partition wall may be constructed between these two surface flows (fractions) and both fractions be discharged via a separate outlet from the deaeration vessel.

The apparatus according to our invention is easy to attach to prior art deaeration tanks, such as so-called Multi-Retention type or so-called Flying Wing type, to form an extension thereto. The apparatus according to our invention is readily connected also afterwards with an existing deaeration vessel of a fiber suspension.

When the inlets (4, 11) introducing the mediums to be treated into the deaeration vessel are so arranged that each of them starts from or is in connection with essentially opposite sides of the vessel, and the outlet/outlets (8; 8', 15) of the fractions (18,19) of the first and the second mediums, which fractions have been separated by weirs K1 and K2, are arranged in connection with that part of vessel (2) which is between the inlets (4, 11) of the first and the second mediums, the arrangement according to the invention may be implemented so that the total space consumption and the layout of the various components is well controlled.

When the means for processing deaeration of the first and the second mediums are each arranged to start from or to be in connection with essentially opposite ends of the vessel, it is possible, in a simple manner, to extend the deaeration equipment from the original, which was intended for deaeration of fiber suspension only, so that it is applicable to deaeration of a second medium also.

This second medium is, for example, water discharged from the wire of the papermaking machine, i.e., so-called white water, fresh water, or a mixture of these, which is then conveyed via a pump and appropriate screens to the headbox, where the ultimate fine-adjustment of the consistency of the stock to be fed to the wire is effected. When the inlets (4, 11) for introducing the mediums to be treated into the deaeration vessel are each arranged to start from or to be in connection with essentially opposite ends of the vessel, the fractions (18, 19) of the first and the second mediums, which fractions have been separated by weirs K1 and K2, may have a common outlet (8). If the fraction (19) separated by weir K2 from the second medium, e.g., white water, is to be further treated separately from the fraction (19) separated by weir K1, it is possible to construct a partition wall 16 between these fractions and to arrange outlets (8', 15) in the immediate vicinity of each other. These arrangements enable the deaeration equipment of the second medium to be readily constructed in connection with an existing deaeration vessel and, on the other hand, the new arrangement of the invention, intended especially for deaeration of two mediums, is very compact.

As can be seen from the embodiments described hereinabove, a deaeration vessel has been developed which is clearly different from the prior art equipment and in which a gas-free or substantially gas-free second medium, needed for fine-adjustment of stock consistency, is prepared. only a few different embodiments of the arrangements according to our invention have been presented hereinabove, and they are by no means intended to limit the extent and scope of the invention from what is disclosed in the accompanying claims, which alone define the extent of the invention.

We claim:

1. A deaeration vessel comprising:

a vessel casing having an interior, and a partition wall disposed in said interior defining a first weir;

a plurality of inlets into said casing for introducing a first fluid medium into said vessel, and at least one outlet from said vessel for a substantially gas free first fluid medium, an outlet for separated gas, and at least one outlet for a fraction of the first medium which has been separated by said weir;

a second partition wall disposed within said vessel interior and forming a second weir;

at least one inlet for a second fluid medium to be introduced into said vessel, and at least one outlet for a substantially gas-free second fluid medium;

at least one outlet for the fraction of the second fluid medium separated by said second weir; and a gas volume provided within said vessel interior in communication with said outlet for separated gas, said gas volume receiving gas separated from both the first and second fluid mediums.

2. A deaeration vessel as recited in claim 1 wherein said at least one outlet for the fraction of the first medium separated by said first weir, and said at least one outlet for the fraction of said second medium separated by said second weir, comprise a common outlet.

3. A deaeration vessel as recited in claim 2 wherein said inlets for the first and second fluidic mediums initially enter said vessel through said bottom thereof.

4. A deaeration vessel as recited in claim 2 wherein said at least one inlet for the second medium is connected to an essentially water discharge from a wire of a paper making machine, the second medium comprising essentially water discharged from the wire of a paper making machine, and wherein said plurality of inlets for the first medium comprises an inlet header common to said plurality of inlets, and connected up to a cellulose fiber suspension.

5. A deaeration vessel as recited in claim 2 wherein said vessel has a bottom, first and second opposite ends, and a central area between said first and second opposite ends; and wherein a plurality of inlets for introducing the first fluidic medium are provided adjacent said first end, and said at least one inlet for introducing the second fluidic medium is provided adjacent said second end, and wherein said outlets for the separated fractions of the first and second fluidic mediums are disposed in said central area, and in said bottom of said vessel.

6. A deaeration vessel as recited in claim 5 wherein said inlets for the first and second fluidic mediums initially enter said vessel through said bottom thereof.

7. A deaeration vessel as recited in claim 5 wherein said at least one inlet for the second medium is connected to an essentially water discharge from a wire of a paper making machine, the second medium comprising essentially water discharged from the wire of a paper making machine.

8. A deaeration vessel as recited in claim 7 wherein said plurality of inlets for the first medium comprises an inlet header common to said plurality of inlets, and connected up to a cellulose fiber suspension.

9. A deaeration vessel as recited in claim 5 wherein said at least one islet for the second medium is connected to a source of essentially fresh water, the second medium comprising essentially fresh water.

10. A deaeration vessel as recited in claim 1 wherein said at least one outlet for the fraction of the first medium separated by said first weir, and said at least one outlet for the fraction of said second medium separated by said second weir, comprise two distinct outlets separated by a divider.

11. A deaeration vessel as recited in claim 10 wherein said divider comprises a partition wall extending upwardly between said distinct outlets for fractions separated from the first and second fluidic mediums.

12. A deaeration vessel as recited in claim 11 wherein said at least one inlet for the second medium is connected to an essentially water discharge from a wire of a paper making machine, the second medium comprising essentially water discharged from the wire of a paper making machine.

13. A deaeration vessel as recited in claim 11 wherein said at least one inlet for the second medium is connected to a source of essentially fresh water, the second medium comprising essentially fresh water.

14. A deaeration vessel as recited in claim 11 wherein said plurality of inlets for the first medium comprises an inlet header common to said plurality of inlets, and connected up to a cellulose fiber suspension.

15. A deaeration vessel as recited in claim 10 wherein said vessel has a bottom, first and second opposite ends, and a central area between said first and second opposite ends; and wherein a plurality of inlets for introducing the first fluidic medium are provided adjacent said first end, and said at least one inlet for introducing the second fluidic medium is provided adjacent said second end, and wherein said common outlet for the separated fractions of the first and second fluidic mediums are disposed in said central area, and in said bottom of said vessel.

16. A deaeration vessel as recited in claim 15 wherein said inlets for the first and second fluidic mediums initially enter said vessel through said bottom thereof.

17. A deaeration vessel as recited in claim 1 wherein said at least one inlet for the second medium is connected to a source of essentially fresh water, the second medium comprising essentially fresh water.

18. A deaeration vessel as recited in claim 1 wherein said plurality of inlets for the first medium comprises an inlet header common to said plurality of inlets, and connected up to a cellulose fiber suspension.

19. A deaeration vessel as recited in claim 1 wherein said at least one inlet for the second medium is connected to an essentially water discharge from a wire of a paper making machine, the second medium comprising essentially water discharged from the wire of a paper making machine.

* * * * *